United States Patent [19]

Kugler et al.

[11] Patent Number: 4,550,285
[45] Date of Patent: Oct. 29, 1985

[54] LOAD-SWITCHING CIRCUIT FOR ANTIPARALLEL THYRISTOR NETWORKS AND A TAPPED TRANSFORMER

[75] Inventors: Kurt Kugler, Hainsacker; Hans-Henning Lessmann-Mieske, Tegernheim; Franz Wein, Beratzhausen, all of Fed. Rep. of Germany

[73] Assignee: Maschinenfabrik Reinhausen Gebruder Scheubeck GmbH & Co. KG, Regensburg, Fed. Rep. of Germany

[21] Appl. No.: 508,439

[22] Filed: Jun. 27, 1983

[30] Foreign Application Priority Data

Jun. 26, 1982 [DE] Fed. Rep. of Germany ....... 3223892

[51] Int. Cl.$^4$ .............................................. H01F 29/04
[52] U.S. Cl. .................................... 323/343; 307/137
[58] Field of Search ............... 323/255, 256, 341, 343, 323/54, 57; 307/252 M, 134, 135, 137; 361/2, 3, 5, 6, 8, 9, 13

[56] References Cited

U.S. PATENT DOCUMENTS 3,466,530  9/1969  Matzl .................................. 323/343
4,432,032  2/1984  Baker et al. ..................... 307/252 M
4,475,139  10/1984  Chadwick ............................ 363/54

*Primary Examiner*—Peter S. Wong
*Assistant Examiner*—Judson H. Jones
*Attorney, Agent, or Firm*—Karl F. Ross; Herbert Dubno

[57] ABSTRACT

A load-switching circuit for a tapped transformer utilizes identical networks of antiparallel thyristors bridged by commutating networks having a condenser in series with a damping impedance. According to the invention, the blocking of one pair of thyristors causes the energization of a relay to operate a switch contact shunting the damping impedance of the blocking pair so that its condenser functions as a voltage spike surge suppressor.

4 Claims, 2 Drawing Figures

LOAD-SWITCHING CIRCUIT FOR ANTIPARALLEL THYRISTOR NETWORKS AND A TAPPED TRANSFORMER

FIELD OF THE INVENTION

Our present invention relates to a load-switching circuit for use with a tapped power transformer and of the type in which antiparallel thyristors are coupled between selected taps of the transformer and the load. More particularly, the invention relates to a circuit of the type in which two substantially identical antiparallel or inverse-pair thyristor networks are provided for respective taps of a power transformer and can be selectively connected with a common load.

BACKGROUND OF THE INVENTION

Load-switching circuits using identical antiparallel or inverse-pair thyristor networks connected to respective taps of a power transformer and selectively connectable with a load so that the switching of the effective pair of antiparallel thyristors controls the load current, have been provided heretofore and represent effective full wave control devices.

Generally speaking a pair of identical inversely poled or antiparallel thyristors are connected in series with a choke between a tap of a power transformer and a load terminal and each of these antiparallel thyristor networks is provided with a commutation capacitor in series with a damping impedance which is connected across the network constituted by the choke and the antiparallel pair of thyristors.

Such circuitry can be operated to provide effective load switching, i.e. shifting of the load from electrical connection to one of the taps to electrical connection to the other of the taps.

Experience has shown that such circuits are subject to voltage transients, i.e. shock or surge voltages, which are applied to the blocked thyristors.

Since thyristors capable of withstanding high peak surges are expensive to manufacture and most thyristor components are not capable of withstanding such high peak surges, it is desirable to minimize the surge voltages to which the thyristors may be subjected.

The usual way of limiting the surge voltages for parallel-connected circuitry elements, e.g. varistors, cannot be used for thyristors because of the differences in the characteristics of these circuit elements. In the case of varistors, this characteristic is such that as the voltage sharply increases (during a surge potential) the varistor responds to limit further build up. With the thyristor, however, a high value of du/dt, i.e. rate of increase in the voltage or the time derivative of the voltage, can trigger a thyristor without application of a triggering pulse to the gate thereby detrimentally affecting the circuit and operation.

OBJECTS OF THE INVENTION

It is the principal object of the present invention to provide a load-switching circuit for a system of the type described whereby the aforementioned disadvantages are obviated.

Another object of this invention is to provide a load-switching circuit for a power transformer whose taps can be selectively connected with the load by antiparallel pairs of thyristors in identical networks, but wherein the thyristors can be of lower cost because they need not be able to withstand as high voltage surges as previously required.

Still another object of the invention is to provide a circuit for the purposes described which is capable of functioning more reliably even in the presence of high voltage surges which have been found to be detrimental to other thyristor load-switching circuits.

SUMMARY OF THE INVENTION

These objects and others which will become apparent hereinafter are attained in accordance with the invention in a load-switching circuit for a tapped transformer, each tap of which can be connected by a respective network of antiparallel or inversely paired thyristors to a common load terminal and wherein, parallel to each thyristor pair, a commutation capacitor is provided in series with a damping resistor. According to the invention, a switch is provided to shunt the damping impedance or resistor of the nonconductive network in the stationary state thereof while this switch is opened during a load-switching operation so that the capacitor or condenser can serve not only as the commutating condenser, but also as a surge voltage suppressor or voltage spike protecting element.

The invention is based upon our discovery that it is possible to utilize the commutating condenser as a capacitor of sufficient size to limit both the voltage rise and the absolute level of brief transient voltage pulses. As a consequence, the commutating condenser provided for each network can additionally have the function as protective and limiting condensers for shock or surge voltages.

During load switching in order to have a proper commutation of the load current without impermissible high current peaks in the thyristor networks, the condenser must be in series with a damping resistor and hence the damping resistor or, more accurately, the damping impedance, is according to the invention, shunted only after load switching has occurred and the commutation function has terminated.

The impedance, of course, includes damping elements of an ohmic or resistive nature as well as inductive damping elements.

Of course, if the damping impedance remained effective during steady state operations, the series network of the damping element and the commutating condenser would be ineffective to protect against surge voltages. Consequently, during the protective periods, the damping elements are shunted and this shunt is only interrupted for the brief period of switchover of the load from one of the taps and thyristor pairs to the other tap and thyristor pair.

This switchover requires only an extremely brief period and it is only during this period that the commutating condenser does not play a role as a protective element. However, during this period, because of the fact that it is extermely brief, there is little danger of substantial injury to the system.

The switch connected in shunt across the damping impedance, e.g. the series network of a resistor and an inductor, constitutes contacts which, when closed, short circuit these elements and, when opened, permit the damping impedance to be effective for commutation.

The damping elements of each thyristor pair can be associated with a respective relay connected to the respective contacts for opening and closing them. Each of the relays is connected in series with a Zener diode between the respective tap and the common terminal. As a result, the two relays are so switched that only the relay of the blocking side receives the potential of the respective transformer stage and is energized. The side of the system which is in conduction, of course, requires no surge voltage protection since any surge voltage can be dissipated through the conductive thyristors of that network.

The Zener diodes in series with the relays drop the voltage further in the relay circuits and are so dimensioned that, in spite of a constantly applied voltage in this series circuit, a clear deenergization of the previously energized relay will occur upon opening of a cam-operated switch connecting a common terminal of the Zener diodes to the common load terminal previously mentioned.

This cam-operated control switch or contact, which can open immediately before the load-switching operation and deenergizes the relay of the previously blocking network, can form a component of the switching system controlling the firing of the thyristors via the gates thereof.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
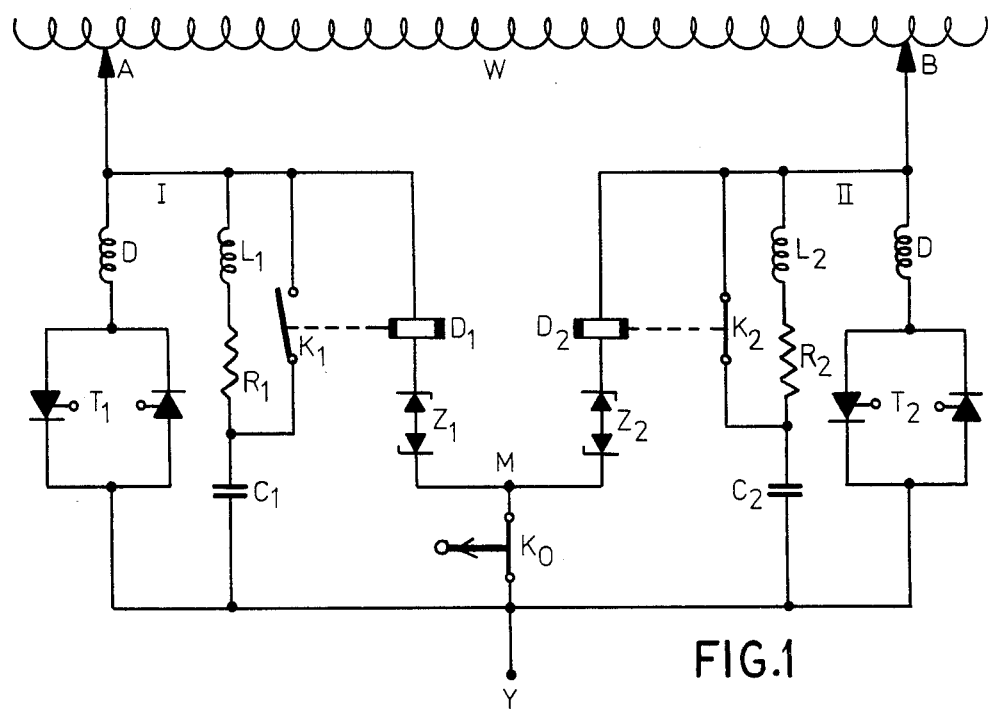
FIG. 1 is a circuit diagram illustrating the principles of the present invention in a stationary state.

In the drawing we have shown a load-switching circuit using two pairs of antiparallel thyristors each connected between a respective tap A or B of a power transformer, the secondary winding of which has been represented diagrammatically at W, and a common load terminal Y.

The other lead to the load has not been illustrated, nor have we shown the circuitry to control triggering of the gates of the thyristors, all of which are common in the art of AC phase control (See *SCR Manual Fourth Edition,* General Electric Co., Syracuse, N.Y. and *Transistor, Thyristor and Diode Manual,* RCA, Harrison, N.J.).

Figure 2:
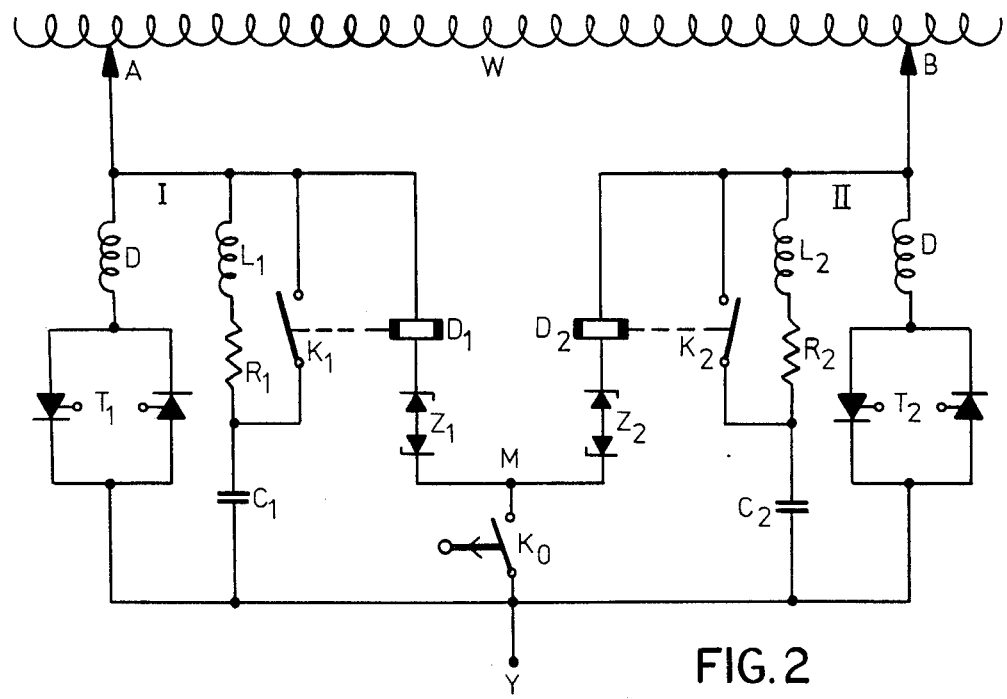
FIG. 2 is a diagram of the same circuit at the instant of load switching.

As will be apparent from FIGS. 1 and 2, two identical networks I and II are provided between the respective taps A and B and the common load terminal Y.

Each of these networks I and II comprises a pair of inversely poled or antiparallel thyristors $T_1$ or $T_2$ and, parallel to the respective pair of thyristors, the commutation network. Each of the commutation networks comprises a commutation condenser $C_1$ or $C_2$ in series with a damping impedance. The damping impedance includes a series network of an ohmic impedance or resistive element $R_1$ or $R_2$ and an inductive impedance or indicator $L_1$ or $L_2$.

Each of these damping impedances is shunted by a respective contact or switch $K_1$ or $K_2$ controlled by a respective relay $D_1$, $D_2$.

Each of these relays is connected in series with a Zener diode $Z_1$ or $Z_2$ between the respective tap A or B and a common terminal M which is connected by the cam-operated contact or switch K with the common load terminal Y.

Each thyristor pair $T_1$, $T_2$ is connected in series with a respective choke D to the tap A or B.

In operation FIG. 1 represents the stationary state in which the tap A is connected with the load terminal Y and the control contact $K_0$ is closed.

This means that the thyristor pair $T_1$ is conductive and that no significant difference appears between the tap A and the terminal Y. As a consequence, the relay $D_1$ is shunted by the thyristor pair and is not energized and the contact $K_1$ is opened so that the inductive and resistive damping elements $L_1$ and $R_1$ are in series with the commutating condenser $C_1$.

By contrast, in circuit II the thyristors $T_2$ are in a blocking state and hence the voltage equivalent to the step difference between the taps is applied across the relay $D_2$ between the tap B and the terminal M. Contact $K_2$ is drawn closed by the relay and thus the damping elements $L_2$ and $R_2$ are shunted by the contact $K_2$ and the condenser $C_2$ acts as a surge suppressing condenser to dissipate voltage surges which would otherwise be applicable to the blocking thyristors and might trigger them into conduction.

When load switching is required, utilizing a command circuit not shown, shortly before the gates of the thyristor pair $T_1$ are deenergized and the gates of the thyristor pair $T_2$ are energized, the cam-operated switch $K_0$ is opened and relay $D_2$ is deenergized to open the contact $K_2$. This restores the commutating function of the network $Z_2$, $R_2$, $L_2$ (see FIG. 2).

The Zener diodes $Z_1$, $Z_2$ in series with the relays $D_1$, $D_2$ increase the voltage drop in the relay circuit and are so dimensioned that in spite of the continuance application of the voltage difference between the taps of this circuit, opening of the cam-operated $K_0$ will insure opening of either of the closed contacts $K_1$, $K_2$.

As soon as commutation in the usual manner is complete, i.e. full current load has been commutated to the thyristor pair $T_2$, closure of switch $K_0$ causes energization of the relay $D_1$, closure of switch $K_1$, shunting of the damping impedances $L_1$, $R_1$, and operation of the condenser $C_1$ as a surge suppressor for the now blocking thyristor pair $T_1$.

We claim:

1. A load-switching circuit between a transformer having a pair of voltage taps and a load terminal, said circuit comprising:

respective substantially identical networks connected between said load terminal and a respective one of said taps, each of said networks including a pair of antiparallel thyristors, and a damping impedance in series with a commutating condenser connected in parallel to said pair of antiparallel thyristors, said condenser being dimensioned to suppress voltage surges applicable to said thyristors in a blocking state thereof; and respective contacts connected in shunt across said damping impedances and selectively operable to short circuit the respective damping impedance of a network whose thyristors are in a blocking state, thereby enabling the respective condenser to function as a surge suppressor.

2. The circuit defined in claim 1, further comprising a respective relay for operating each of said contacts connected between the respective tap and said terminal such that the relay associated with the blocking pair of thyristors is energized to close the respective contact.

3. The circuit defined in claim 2, further comprising a respective Zener diode in series with each of said relays.

4. The circuit defined in claim 3 wherein each relay in series with the respective Zener diode is connected to a common terminal, said circuit further comprising a cam-operated switch between said common terminal and said load terminal.

* * * * *